Patented Nov. 22, 1938

2,137,247

UNITED STATES PATENT OFFICE 2,137,247

METHOD OF PRESERVING ADOBE AND OTHER POROUS MATERIAL

Frederick T. Martius, Omaha, Nebr.

No Drawing. Application November 16, 1936, Serial No. 111,079

2 Claims. (Cl. 260—32)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (ch. 460, 45 Stat. L. 467).

My invention consists in the method of preserving adobe bricks or structures built of adobe or like material by impregnating at least the surface of the same with a waterproofing compound in the form of a clear colorless liquid.

To obtain this compound I produce a solution by dissolving vinyl resin of the vinyl acetate group of synthetic resins obtained by the polymerization of pure vinyl acetate into a clear, solid, transparent resin in an amount of approximately 10 grams for each percent solution desired, in 55–60 c. c. of acetone preferably 57 c. c. or multiples thereof according to the percent solution and then making up the solution to 1000 c. c. with toluene.

The following table illustrates clear, colorless solutions which I have used with great success:

| Volume | Percent solution | Grams vinyl resin | C. c. acetone | Toluene |
|---|---|---|---|---|
| C. c. | | | | |
| 1000 | 1 | 10 | 57 | Remainder. |
| 1000 | 2 | 20 | 114 | Do. |
| 1000 | 3 | 30 | 171 | Do. |
| 1000 | 4 | 40 | 228 | Do. |
| 1000 | 5 | 50 | 285 | Do. |

It is to be understood however that the foregoing table is only illustrative and that higher concentrations and variations in the relationships between the individual elements may be made without departing from the spirit of my invention as defined by the appended claims, so long as the consistency of the solution is such that upon drying the applied liquid is absorbed into the sub-surface interstices of the object leaving the surface interstices substantially empty, whereby the surface of the object retains its original texture and color.

I have found that such a clear and colorless liquid compound made particularly to waterproof and preserve adobe bricks, or structures built of adobe when sprayed or brushed into the surface of the adobe, waterproofs and preserves the adobe without changing either the original color or texture, except as caused by a slight change of the indices of refraction of light due to the absorbed compound on the particles of the adobe. Furthermore, the compound does not form a glossy film but penetrates into the adobe.

Adobe sprayed with this clear and colorless liquid compound will not dust off when brushed against, thus making it resistant to abrasion from wind-borne sand.

This compound is equally effective for the waterproofing of concrete, wood, cloth, and any other porous materials and for the waterproofing and preservation of archaeological objects of any material or description including Indian and other ruins built of adobe, sandstone or other rock material, or antiques made of clay or any other similar substance or material; painted or colored objects or inscriptions, wood, cloth, etc.; and for the preservation of paleontological objects such as fossils and bones without either changing their color or texture, thus preventing decomposition or deterioration of the subjects so treated.

Having thus described my invention, what I claim is:

1. The method of preserving objects made of adobe and like granular porous materials which consists in impregnating at least the surface thereof, without the production of a glossy surface, with a clear colorless liquid consisting of a solution of a vinyl acetate resin in acetone and toluene in the ratio of approximately 10 grams of vinyl resin to 55–60 cc. of acetone per percent of solution desired. the solution being made up to approximately 1000 cc. with toluene and having a consistency such that the surface of the object retains its original texture and color and is waterproof and resistant to abrasion.

2. A composition for rendering objects made of adobe and like granular porous materials water proof and resistant to abrasion which consists in a clear colorless solution of a vinyl acetate in acetone and toluene in the ratio of approximately 10 grams of vinyl resin to 55 to 60 cc. of acetone per percent of solution desired, the solution being made up to approximately 1000 cc. with toluene, producing a consistency, which upon drying, causes the applied liquid to be absorbed into the sub-surface interstices of the object, leaving the surface interstices substantially empty, whereby the surface of the object treated with said composition retains its original texture and color and is waterproof and resistant to abrasion.

FREDERICK T. MARTIUS.